United States Patent [19]

Cavanaugh

[11] 3,876,993

[45] Apr. 8, 1975

[54] RANDOM ACCESS MEMORY CELL

[75] Inventor: Marion E. Cavanaugh, Houston, Tex.

[73] Assignee: Texas Instruments Incorporated, Dallas, Tex.

[22] Filed: Mar. 25, 1974

[21] Appl. No.: 454,349

[52] U.S. Cl....340/173 DR; 340/173 R; 340/173 CA; 307/238

[51] Int. Cl..................... G11b 13/00; G11c 11/44

[58] Field of Search ................. 340/173 R, 173 DR; 307/238

[56] References Cited

UNITED STATES PATENTS 3,576,571 4/1971 Bocher........................ 340/173 DR 3,801,964 4/1974 Palfi............................ 340/173 DR

*Primary Examiner*—Terrell W. Fears

*Attorney, Agent, or Firm*—Harold Levine; Edward J. Connors; John G. Graham

[57] ABSTRACT

A memory cell comprising field-effect transistors for use in a random access memory array. The cell is of the dynamic type wherein data is stored on capacitive elements, and is self-refreshing; no circuitry external to the array is needed for refresh, other than clock sources. Four MOS field effect transistors are employed, with two non-overlapping clocks, a data buss for each row of the array and one address line for each column. One of the storage capacitances may be a voltage-dependent capacitor element.

23 Claims, 8 Drawing Figures

RANDOM ACCESS MEMORY CELL

BACKGROUND OF THE INVENTION

This invention relates to memory cells of the type used in random access memory devices implemented in large-scale-integrated semiconductor circuits.

Complex integrated circuits made for use in calculators or other data processing systems, or computer main frame memory arrays, employ MOS memory cells which have been of several types. Static cells or flip-flop circuits have been generally avoided, because of the excessive space needed for each cell. Dynamic cells using a capacitor as the storage mechanism are widely used. A common example is the "three transistor cell" type as shown in U.S. Pat. No. 3,585,613 or in copending application Ser. No. 163,683, filed July 19, 1971, now abandoned assigned to Texas Instruments Incorporated. The three transistor cell has found great utility; one disadvantage, however, is that it must be refreshed periodically. The voltage on the storage capacitance decays after a certain period, and so the data stored must be read out and written back in to make sure that data are not lost. The need for refresh imposes a requirement that programming be provided to implement the cyclic read-out and write-in, and that circuitry be provided to sense the stored data, amplify it, and feed it back into the cells. Arrangements for refreshing three-transistor RAM cells are shown in U.S. Pat. Nos. 3,713,114 and 3,718,915. One-transistor cells of the type set forth in patent application Ser. No. 385,122, filed Aug. 2, 1973 and assigned to Texas Instruments Incorporated, have the same requirement for refresh, circuitry for this purpose being shown in U.S. Pat. No. 3,737,879. In attempts to eliminate the need to refresh in random access memory or RAM cells, various other types of cells have been proposed. An example of such cells is shown in Digest of Technical Papers, 1972 IEEE International Solid-State Circuits Conference, pages 14–15, by T. R. Walther and M. R. McCoy. The so-called invisible refresh cell provides an apparently static (refresh without addressing) operation in a dynamic-sized cell. However, there are objections to this type of cell. First, the cells supply refresh currents in one direction only, making them susceptible to stray currents induced by noise or leakage, but especially to the so-called charge pumping phenomenon, where a small DC current is injected from the substrate by a driven gate. This current is in the opposite direction to leakage, so that a storage node may accumulate erroneous charges in either direction. Second, the invisible refresh cell is objectionable in that the storage node must normally be large compared to the sensing transistor, dictating the use of either small and slow sense transistors or large and inefficient storage nodes. In prior invisible refresh cells, a sense transistor was used which did not aid in the development of a bootstrap refresh current, but instead was part of a parasitic capacitance between a storage node and the substrate; in constrast, the sense transistor in the cell of this invention does aid in the development of bootstrap refresh current.

SUMMARY OF THE INVENTION

It is the object of this invention to provide a memory cell or storage cell of the type implemented in semiconductor integrated circuits, particularly a cell which is of very small size so that a large number of cells can be provided in a small area of a semiconductor chip. Another object is to provide a cell of the type used in a random access memory which does not require periodic refreshing. It is an object of the invention to provide a self-refreshing or "invisible refresh" operation in a RAM cell. An additional object is to provide a selrefreshing MOS RAM cell which is less subject to erroneous data being generated by noise, leakage or "charge-pump". Further, it is an object to provide an MOS RAM cell which is efficiently laid out or patterned in a semiconductor integrated circuit form. Another object is the provision of a RAM system which uses a minimum of clock voltages, and needs only a single address line for each column of cells and a single data line for each row of cells in the RAM array, and further requires a minimum of supporting circuitry external to the array of cells. It is another object to provide a RAM cell implemented in integrated circuit form which requires a minimum of contacts between semiconductor regions and overlying conductor regions, as such contacts are wasteful of area on a semiconductor chip; in this invention only one such contact is required per cell.

In accordance with an embodiment of the invention, a cell is provided that employs four MOS transistors. The source-drain path of one transistor is connected between a source of read clock pulses and a source node, with the gate of this transistor being the storage node. A second transistor has its source-drain path connected between the source node and a refresh node, with the gate of the second transistor being driven by the read clock pulses. A third transistor connects the refresh node back to the storage node, with the gate of this transistor being driven by write/refresh clock pulses which are out of phase with the read clock pulses. The source-drain path of a fourth transistor is connected between the refresh node and a data buss, with the gate of this transistor being driven by an address line. The major capacitances are those existing at the storage and refresh nodes. The storage node capacitance may include a voltage dependent capacitance between the gate and drain or between the gate and source of the first transistor, so that this device operates in the bootstrap mode, although such capacitance is not restricted to only voltage dependent capacitors.

BRIEF DESCRIPTION OF THE DRAWINGS

The novel features believed characteristic of the invention are set forth in the appended claims. The invention itself, however, will best be understood by reference to the detailed description which follows, read in conjunction with the accompanying drawing, wherein:

Referring to FIG. 1, a memory cell according to the invention is illustrated. The cell includes four MOS transistors Q1, Q2, Q3, Q4 of the p-channel type. The source-drain paths of transistors Q1 and Q2 are connected in series between a $\phi1$ line 10 and a node A. The source-drain paths of Q3 and Q4 are connected in series between a data I/O line 11 and the gate of Q1. The gate of Q2 is driven from a $\phi1$ line 12, and the gate of Q3 is driven from a $\phi5$ line 13. Transistor Q4 is turned on only when addressed from an address line 14. The voltage-time sequences of $\phi1$ and $\phi5$ are shown in FIG. 2, with the repetition rate being about 80 KHz or less. Generally, a negative voltage (−Vdd) is a logic 0 and a more positive voltage (usually ground or Vss) is a logic 1, although these are interchangable. When the cell of FIG. 1 is addressed by a 0 or −Vddnegative voltage on the address line 14, the voltage on the I/O line 11 charges the capacitance of node A. Thus, if the I/O line 11 is at −Vdd or 0, the node A will go to a negative voltage; if the I/O line 11 is at Vss or 1, the node A will discharge to or stay at this Vss level. Assuming that "Address" and "I/O" subsist on lines 14 and 11 during $\phi5$, then Q3 will turn on and the gate of Q1 or the capacitance of anode B will charge (or discharge) toward the same level as the I/O line. Then, during the next $\phi1$ time, the voltage levels on the capacitances of nodes A and B will be equalized and reinforced. If a 0 is stored, a negative voltage is on the gate of Q1 and it will tend to turn on and its gate will "bootstrap" more negative during $\phi1$, as will Q2 turn on because of $\phi1$ on its gate, and node A will be charged more negative from the $\phi1$ line through the source-drain paths of Q1 and Q2. Then, on the following $\phi5$, the capacitance of node B will charge more negative from node A through Q3. On the other hand, if a 1 or Vss had been stored, the voltage on the capacitance of node B or the gate of Q1 would be short of threshold and Q1 would not tend to turn on, so during $\phi1$ any slight negative charge on the capacitance of node A would tend to be dissipated into node C, then when Q3 is turned on by $\phi5$ the node A & B capacitors are parallel again and equalized. It should be noted that if a negative voltage greater in value than a threshold voltage Vt exists on node B, but smaller in value than a legitimate 0 voltage, Q1 will be turned on just enough to discharge node C into $\phi1$ when $\phi1$ is at Vss thereby allowing the foregoing charge transfer actions to transpire. Thus, either a 1 or a 0 is reinforced; the cell is bidirectionally self-refreshing. Upon read-out or recall, the I/O line 11 is assumed to be precharged to ground or Vss, and the address line 14 is assumed to be negative during $\phi1$. If a 0 is stored on the capacitance of node B, Q1 will be turned on, as will Q2 and Q4, so the I/O line will be driven toward −Vdd from the $\phi1$ line through Q1, Q2 and Q4, while the node A will be reinforced, i.e., the read-out is nondestructive. If a 1 had been stored, Q1 would be turned off, so $\phi1$ would not be connected through Q1, etc. to the I/O line, node A would be at about Vss, so when Q4 turns on no charge would be transferred and both the I/O line and node A would remain at Vss.

Referring to FIGS. 3*a*–3*c*, a simplified layout of a memory cell of FIG. 1 on an n-type semiconductor chip 30 is illustrated. The cell includes two p-diffusion strips 31 and 32 which form the I/O line 11 and the $\phi1$ line 10, and further includes three metal strips 33, 34 and 35 overlying thick field oxide 36 to form the address line 14, the other $\phi1$ line 12, and the $\phi5$ line 13, respectively. The gates of transistors Q4, Q2 and Q3 are formed beneath the metal strips 33, 34, 35 by thin oxide regions 37, 38 and 39, respectively, which are indicated by dotted lines on FIG. 3a. An irregularly shaped p-diffused region 40 forms the drain of Q1 and the source of Q2 and also defines the capacitance of of node C, while a relatively large p-diffused region 41 forms the drain of Q2, the source of Q4 and the source of Q3; the region 41 defines the node A, principally forming a p-n junction capacitance with the substrate 30 which is labeled a capacitor 42 in FIG. 1. Another p-diffused region 43 forms the drain of Q3 and an area to which a contact 44 is made by a metal area 45 that also forms the gate of Q1 and one plate of the capacitance Cf of node B which is labeled as a capacitor 46 in FIG. 1. A thin oxide area 47 shown by dotted line defines the gate insulator for Q1 and also the dielectric of the capacitor 46. A capacitance exists between node B and the substrate, principally formed by the p-diffused region 43; this capacitance is labeled as a capacitor 48 in FIG. 1. The capacitor 48 is the only capacitance in the circuit which is detrimental to operation, so it is made as small as practical. Another cspacitance exists between the p-diffused region 40 and the substrate 30, and this labeled as a capacitor 49 in FIG. 1; this capacitance Cs at the source node C aids the circuit operation and so the region 40 is made larger than needed to merely connect Q1 and Q2.

Figure 1:
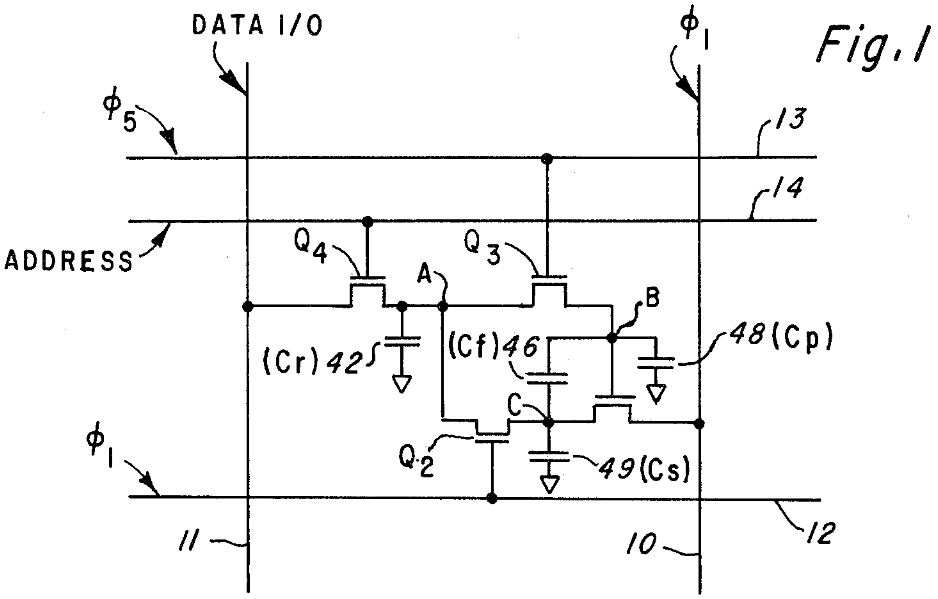
FIG. 1 is an electrical circuit diagram in schematic form of a memory cell according to the invention.
Figure 2:
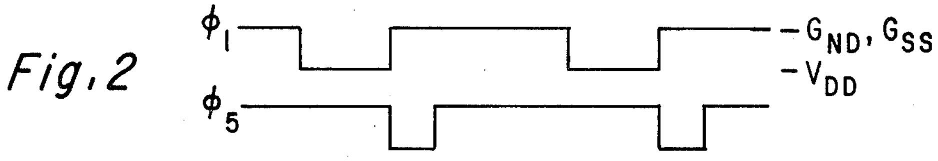
FIG. 2 is a graph of voltage vs. time for clock pulses used in the circuit of FIG. 1.
Figure 3A:
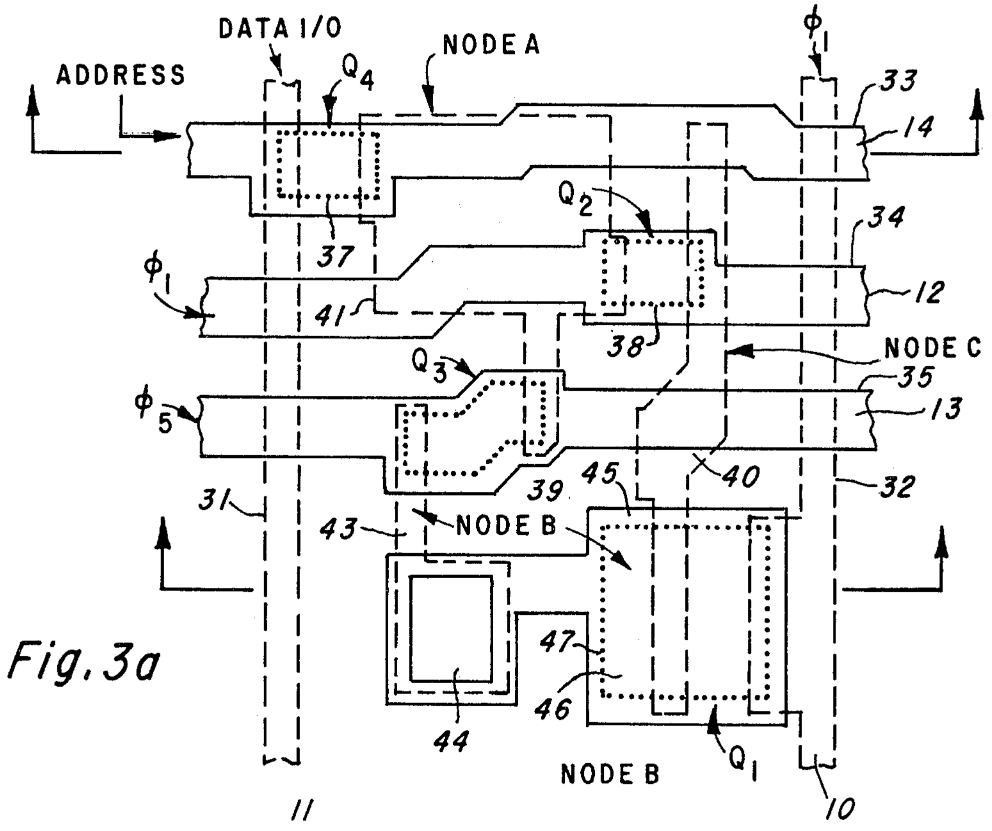
FIG. 3*a* is a plan view, greatly enlarged, of the cell of FIG. 1 in a form that it may be manufactured as a semiconductor integrated circuit.
Figure 3B:
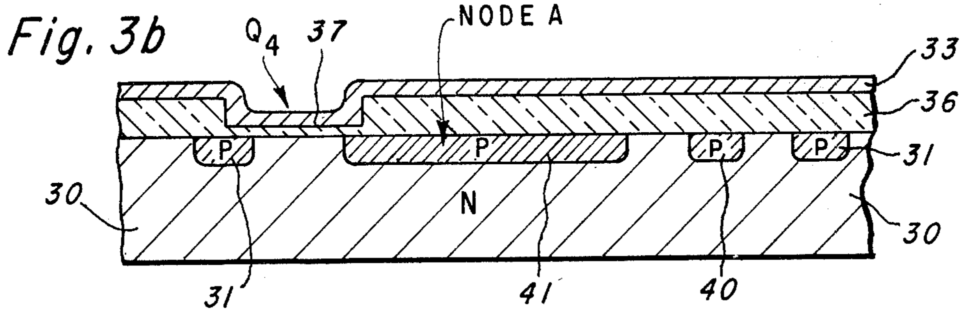
FIG. 3*b* is an elevation view in section of part of the cell of FIG. 3*a*, taken along the line b—b in FIG. 3*a;*
Figure 3C:
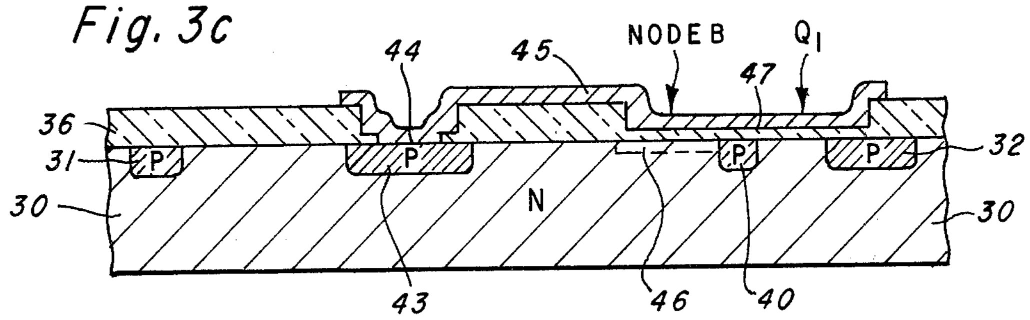
FIG. 3*c* is an elevation view in section of part of the cell of FIG. 3*a*, taken along the line c—c in FIG. 3*a;*

The capacitor 46 is voltage-dependent. When a negative voltage exists on node B, a surface region 50 beneath the metal 45 in the thin oxide area 47 is inverted from N to p type just as the channel is formed in an MOS transistor. This inverted region is connected to the region 40 and forms the bottom plate of the capacitor 46. When the metal 45 is at Vss potential, on the other hand, the value of the capacitance 46 is much smaller since the n-type region beneath it will not be inverted. The node B capacitance remains roughly the same for storing a Vss level, however, because as the value of the capacitor 48 increases, the value of the capacitor 46 decreases.

Figure 4:
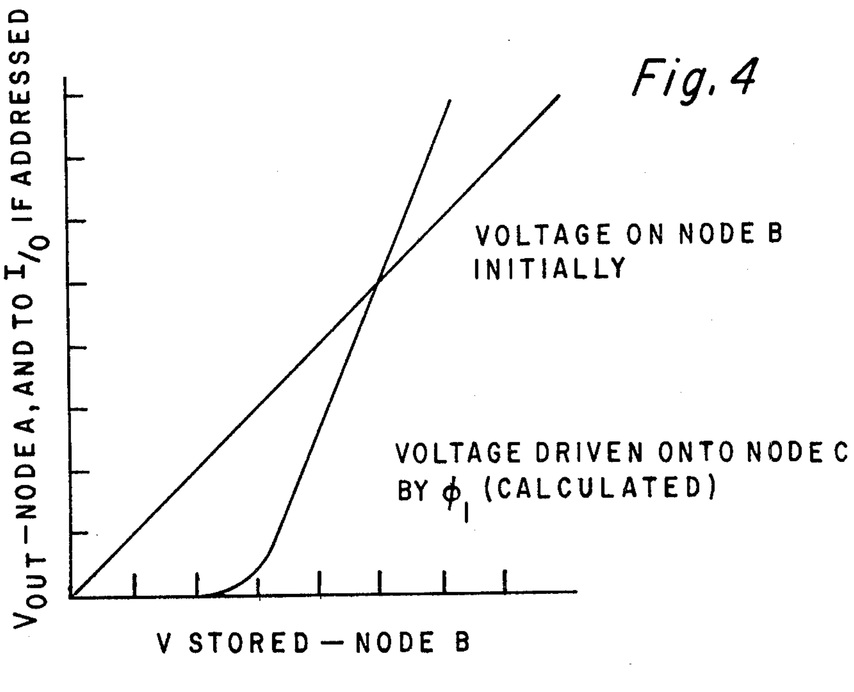
FIG. 4 is a graph of voltages appearing in the cell of FIG. 1.

The operation of the cell of FIGS. 1 and 3*a*–3*c* will be considered in another manner. When $\phi1$ goes to −Vdd, Q2 becomes conductive and connects node C with node A. If a negative charge greater than a threshold voltage Vt is stored on node B, then nodes A and C will be connected to $\phi1$ or line 10 through Q1; since $\phi1$ is at −Vdd at this time, a negative voltage will be driven into nodes A and C of a value of roughly $$[Vgs - Vt]\ \frac{Cf + Cp}{Cf}$$

where Vgs is the gate-to-source voltage of transistor Q1, Vt is the threshold voltage of the transistor Q1, Cf is the value of the capacitor 46, and Cp is the value of the capacitor 48. This voltage on node C can be either smaller or larger than the initial value of the voltage on node B as shown in FIG. 4. The value of the node C voltage is actually slightly larger than the equation indicates, because the enhancing influence of the gate to drain capacitance of Q1 is ignored in the question.

Note that while node C will normally discharge to Vss each time $\phi 1$ is at Vss, node A, being isolated by Q2, will remain at the value calculated, changing only when the value calculated dictates it should do so.

The voltage relationship between nodes B and C is important. When node B is driven negatively by Q1, a dynamic current is driven through the capacitor 46 which increases the voltage on node B by $$dVB = \frac{Cf + Cp}{Cp} dVC$$

where dVB is the resulting change in voltage on node B, Cf is the value of the capacitor 46, Cp is the value of the capacitor 48, dVC is the voltage change on node C.

It is this feedback action which, as shown in FIG. 4, provides negative voltage refreshing.

Now assume that $\phi 1$ goes to Vss, isolating node A from node C or turning off the transistor Q2, and that $\phi 5$ goes to −Vdd so that the transistor Q3 is turned on and nodes A and B are connected. $\phi 1$ is at Vss thereby allowing node C to discharge to Vss, thus causing node B to be reduced from the large negative bootstrap or feedback value to its minimum or storage value; the charges on nodes A and B will tend to equalize. Since some values of node B voltage result in the above sequence, putting a reduced voltage on node A, while other (higher) values put an increased voltage on node A, the result is that a net current flow either into or out of node B is established. With the proper values of capacitance on node A and node B, a current much larger than the so-called "charge pumping" currents predicted for MOS is established, so that both "ones" and "zeros" are reinforced.

Reading out of the cell is accomplished merely by making the address line 14 negative during $\phi 1$. Writing into the cell is accomplished by making the address line 14 negative during $\phi 5$. If operation were slow enough, the I/O buss 11 could be used for refreshing exactly as node A is used in the operation described above; however, since the buss 11 represents a relatively large capacitance, this is probably not practical in most cases. Normally, it will be desirable to read a relatively low voltage on the buss 11 and than to drive a large amplitude signal back onto the buss for write/refresh. Of course, there are many, for example sixteen, cells on the buss 11 and only one at a time may be unambiguously addressed, so at all other times (fifteen memory cycles out of sixteen on the average in the example) the cell does not access the buss 11.

Again considering the operation of the RAM cell of the invention, the transistor Q1 will be defined as the sense transistor. The gain of the sense transistor Q1 is $$Av = \frac{Cf + Cp}{Cp}$$

where Av is the gain, (Cf + Cp) ≈Cs ≈Cr, Cf is the capacitance of the storage node B or feedback capacitance, Cp is the parasitic storage node capacitance 48, Cs is the parasitic source node C capacitance 49, and Cr is the parasitic refresh node A capacitance 42.

Assume that the voltage gain Av is 3, and that the storage node B is at a weak 1 (which is defined as toward Vss, or Vss at full amplitude), then it is seen that 3(Vgs −Vt) will be less than Vf where Vf is the voltage on Cf, the stored voltage. As a result, prior to the $\phi 1$ going negative, Cs (49) will "bleed" off into the $\phi 1$ source, and when $\phi 1$ goes negative. Cr (42) will partly discharge (assuming it is at Vf initially) into Cs (49). When $\phi 1$ goes positive, $\phi 5$ goes negative and Cf (at B) will partly discharge into Cr (42). Repeating this cycle periodically results in an apparent net DC current into the node B capacitance Cf (positive convention), discharging Cf toward Vss.

On the other hand, assuming Vf is less than 3(Vgs −Vt), the same procedure results in both Cr (42) and Cs (49) being partly charged during $\phi 1$, then Cr partly charging during $\phi 5$. This then results in an apparent net DC current away from Cf, charging Cf toward Vdd.

The results in an "invisible-refresh" type cell which reinforces the stored voltage in both directions, both toward Vss and toward Vdd (actually, toward Vss −Vt and toward Vdd −Vt, since a threshold is encountered in both directions).

Figure 5:
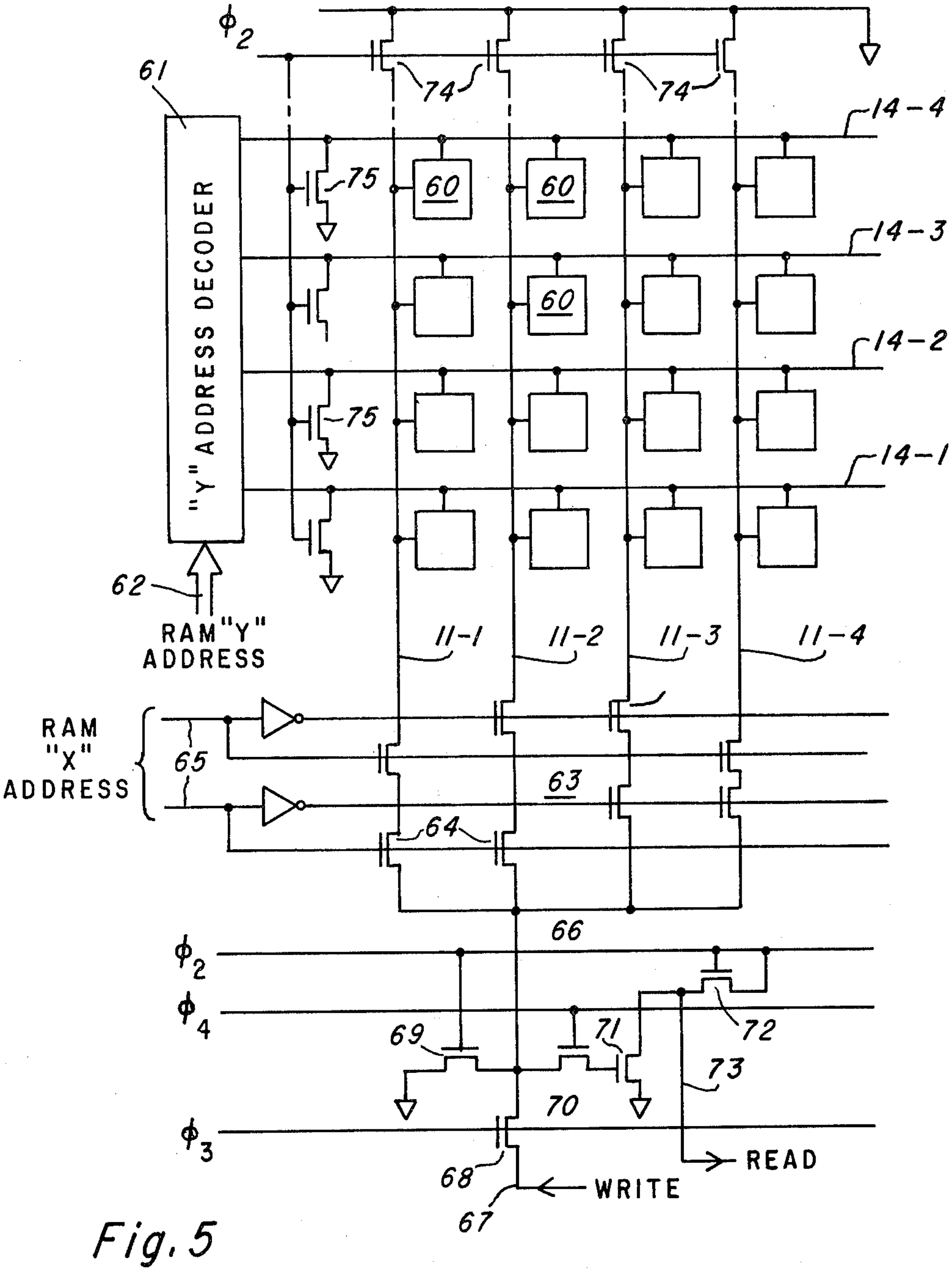
FIG. 5 is an electrical circuit diagram in schematic form of a memory array using the cells of FIG. 1.

Referring to FIG. 5, a random access memory is shown according to the invention. The array comprises a large number of cells 60, each of which is of the type described above with reference to FIGS. 1 and 3*a*–3*c*. A four-by-four array of cells 60 is shown, but it is of course understood that a much larger array would be used. For example, in a chip for a hand-held calculator, an array as in FIG. 5 would be perhaps sixteen-by-sixteen, organized in four-bit or BCD format. An address line 14 is provided for each row, labeled 14-1 to 14-4. The two $\phi 1$ lines and the $\phi 5$ line are not shown in the array, but would be present just as in FIGS. 1 and 3*a*–3*c*. One of the address lines is selected by a Y address decoder 61, which receives an encoded address at an input 62. For a 16 × 16 array, there would be sixteen of the lines 14, and the input 62 would be a four-bit code. The lines 11 are selected by an X decoder 63 which comprises a combination of transistors 64. One of the four lines 11-1 to 11-4 is selected according to an address on lines 65; if a code 01 exists on lines 65 the line 11-4 would be selected, a code 11 would select line 11-1, etc. Thus, an I/O line 66 would be connected to only one of the lines 11, depending upon the code on input 65. Of course, a similar decoder 63 would be provided for each group of four of the lines 11 in the above example, or if the RAM is organized differently then another appropriate decoder would be used.

Figure 6:
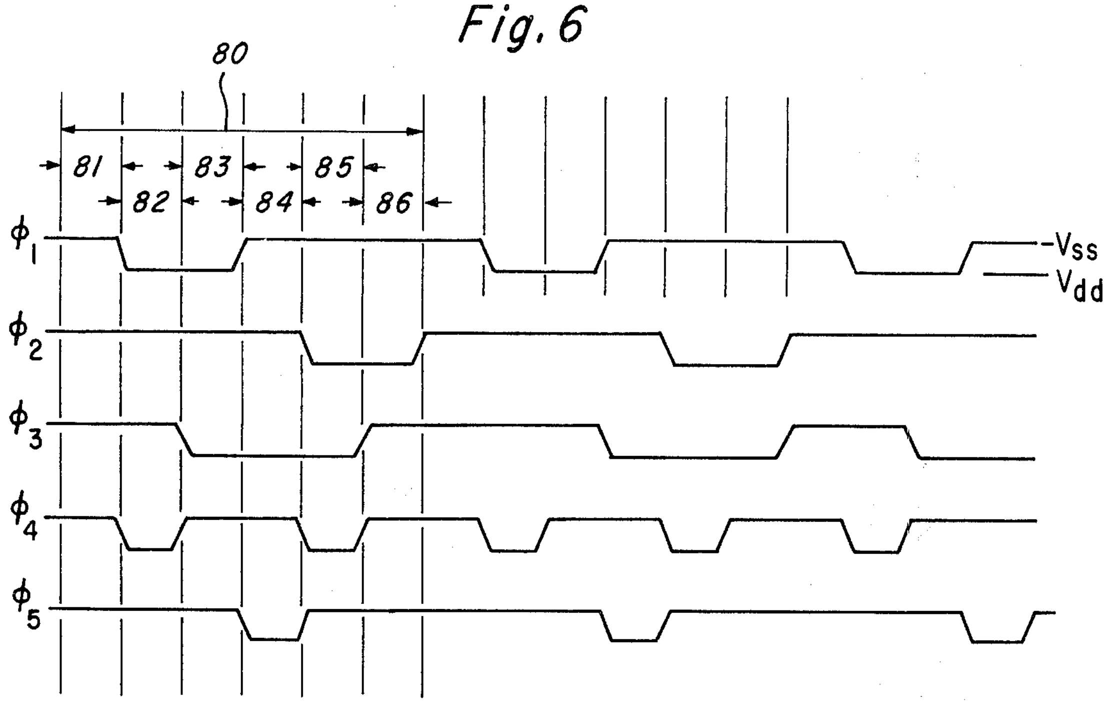
FIG. 6 is a graph of voltage vs. time for clock pulses used in the system of FIG. 5.

A timing diagram for clock voltages in the system of FIG. 5 is shown in FIG. 6. This clock sequence is the same as used for the remainder of the calculator chip mentioned above. The basic machine cycle is an interval 80 made up of six intervals 81–86 each of which is nominally two or more microseconds in length, so the interval 80 or machine cycle time is twelve microseconds or more. The phase $\phi 1$ exists during intervals 82 and 83, $\phi 2$ during 85 and 86, $\phi 3$ during 83, 84 and 85, $\phi 4$ during 82 and 85, and $\phi 5$ during interval 84, as seen in the drawing. As noted above, only $\phi 1$ and $\phi 5$ are needed in the cells per se.

Input/output circuitry connected to the line 66 includes a Write input line 67 connected through a device 68 clocked on $\phi 3$, so that data reaches the line 66 during the important interval, $\phi 5$, when it must exist on the selected line 11. Phase $\phi 3$ is wider than needed, but existed for other purposes in the system. The line 66 is shorted to Vss during $\phi 2$ by a device 69 which is clocked on $\phi 2$. Data is read out of a cell 60 during $\phi 1$, onto lines 11, and so will exist on line 66 at this time. For read out, the data goes through a device 70 which is clocked at $\phi 4$, to the gate of an inverting transistor 71, where it stays until the beginning of $\phi 2$ when a load transistor 72 is turned on, so the data will appear inverted on output line 73, during $\phi 2$. The bit on the gate of device 71 will be shorted to Vss through devices 69 and 70 during the interval 85 of $\phi 4$, when $\phi 2$ is also on.

The I/O lines 11 are shorted to Vss during $\phi 2$ by devices 74 on intervals 85 and 86, since it is necessary for the lines to be at Vss before read out which occurs during interval 82 of the next cycle. The address lines 14 should be at Vss except during $\phi 2$, so devices 75 are shown for this purpose, although this function could be part of the address decoder 61.

The circuitry of devices 68–73 would be repeated for each of the four groups of cells or "pages" of the RAM, in the calculator chip previously mentioned.

In the embodiments described above, the voltage-dependent capacitor 46 is shown connected between the gate of the transistor Q1 and the node C. Instead, the capacitor could be placed between the gate of the transistor Q1 and the $\phi 1$ line 10, i.e., to the region 32 of FIGS. *3a–3c*. Thus, a drain-bootstrap capacitor could be used in place of a source-bootstrap. The two are almost equivalent electrically, but the arrangement shown is easier to lay out on the chip.

The cell of the invention is shown herein as being made up of p-channel MOS transistors; however, n-channel devices may be used instead. The term "MOS" is meant to include not only traditional "metal-oxide-semiconductor" devices but also silicon gate devices and field effect transistors which use nitride, or oxide and nitride, as the gate insulator. That is, the term MOS transistor is synonymous with insulated gate field effect transistor.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is;

1. Storage means comprising a storage node having capacitance, a second node having capacitance, an intermittent voltage source, first and second switching means connecting the voltage source to the second node, the first switching means being controlled by the voltage on the storage node, the second switching means being controlled by first recurring clock pulses, a third switching means connecting the second node to the storage node, the third switching means being controlled by second recurring clock pulses out of phase with the first clock pulses.

2. Storage means according to claim 1 wherein the second node is connected to means for writing in and reading out data.

3. Storage means according to claim 2 wherein the second node is connected to the means for writing in and reading out data via a fourth switching means which is controlled by an address signal.

4. Storage means according to claim 1 wherein the first and second recurring clock pulses are non-overlapping.

5. Storage means according to claim 4 wherein the intermittent voltage source is the same as the first source of recurring clock signals.

6. Storage means according to claim 5 wherein the second node is connected to means for writing in and reading out logic levels via a fourth switching means which is controlled by an address signal.

7. Storage means according to claim 6 wherein the address signal subsists during the first recurring clock signals for reading out and during the secoond recurring clock signals for writing in.

8. Storage means according to claim 7 wherein the switching means are insulated gate field effect transistors.

9. Storage means according to claim 8 wherein at least part of the capacitance of the storage node is an MOS transistor across the first switching means.

10. A memory cell comprising first and second sources of recurring clock signals, a first field effect transistor having a current path connected between a voltage supply and a source node, a second field effect transistor having a current path connected between the refresh node and a storage node, the gate of the second field effect transsistor being connected to the first source of clock pulses, transistor gate of the third transistor being connected to the second source of clock signals, and means for reading out and writing in logic levels to the refresh node.

11. A memory cell according to claim 10 wherein said voltage supply is the first source of clock signals.

12. A memory cell according to claim 11 wherein the means for reading out and writing in comprises a fourth field effect transistor having a current path connected between the refresh mode and a source of data.

13. A memory cell according to claim 12 wherein the gate of the fourth field effect transistor is driven by address signals which are on during the first clock signals for reading out and on during the second clock signals for writing in.

14. A memory cell according to claim 13 wherein the storage node includes capacitance existing between the storage node and the source node.

15. A memory cell according to claim 14 wherein said capacitance includes an MOS capacitor.

16. A memory cell according to claim 14 wherein said capacitance includes a voltage-dependent MOS capacitor device.

17. A memory cell according to claim 11 wherein an MOS capacitor is provided between said storage node and the first source of clock signals.

18. A self-refreshing memory cell for a random access memory system comprising first and second capacitance means, a plurality of switching means each having a current path and a control means for controlling current through the current path, means providing first and second periodic clock pulses with the second following the first, first and second of the switching means having current paths connected in series between the first clock pulse and a first node, the first capacitance means being provided at the first node, at least part of the second capacitance means being provided between the control means of the first switching means and a second node, the second node being at the intersection in the current paths of the first and second switching means, the control means of the second switching means being connected to the first clock pulse, a third one of the switching means having its current path connected between the first node and the second capacitance means and having its control means connected to the second clock pulse, and a fourth of the switching means having its current path connected between the first node and a data source and having its control means connected to an address signal source.

19. A memory cell according to claim 18 wherein the switching means are insulated gate field effect transistors.

20. A memory cell according to claim 19 wherein the first and second clock pulses are non-overlapping.

21. A memory cell according to claim 20 wherein the third capacitance means exists at the second node.

22. A memory cell according to claim 21 wherein the voltage on the second capacitance means is caused to bootstrap to a different potential when the first clock pulses switch levels.

23. A memory cell according to claim 22 wherein the cell reinforces a logic one or logic zero stored on the first and second capacitance means.

* * * * *